C. F. HICKS.
TIRE LINER.
APPLICATION FILED MAR. 31, 1922.

1,423,423.

Patented July 18, 1922.
2 SHEETS—SHEET 1.

Witness
J. M. Jester

Inventor
C. F. Hicks
By Victor J. Evans
Attorney

C. F. HICKS.
TIRE LINER.
APPLICATION FILED MAR. 31, 1922.
1,423,423.
Patented July 18, 1922.
2 SHEETS—SHEET 2.
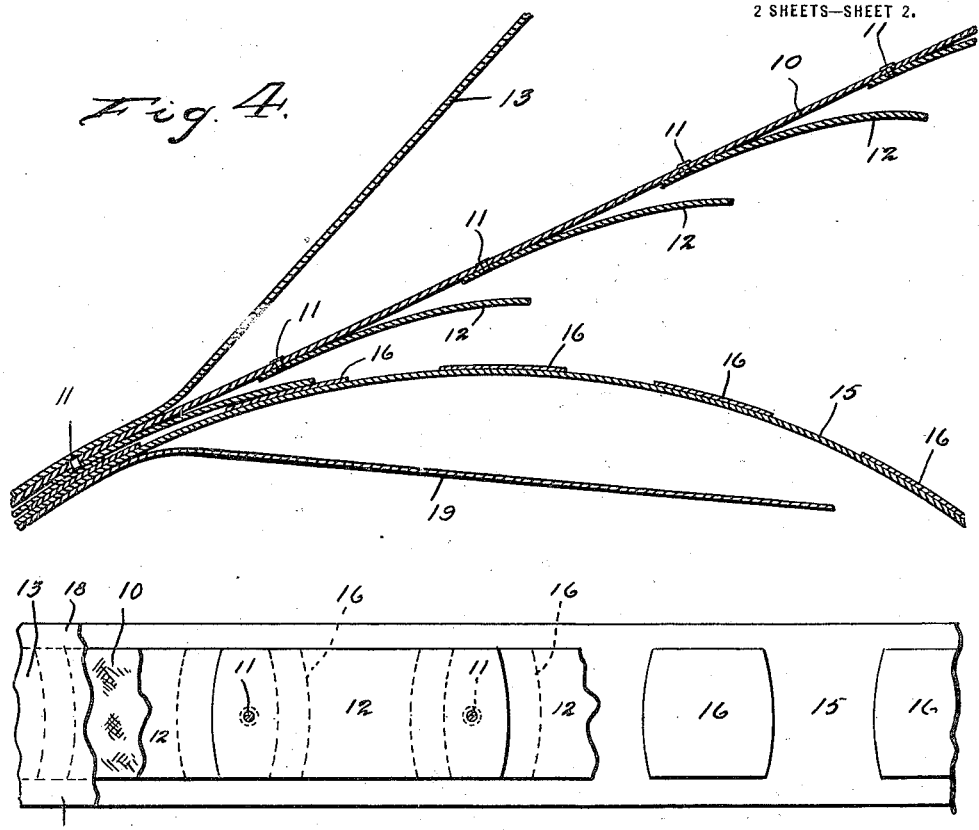
Witness:
J. M. Jester
Inventor
C. F. Hicks
By Victor J. Evans
Attorney

UNITED STATES PATENT OFFICE.

CHARLES F. HICKS, OF ROMEO, MICHIGAN.

TIRE LINER.

1,423,423. Specification of Letters Patent. Patented July 18, 1922.

Application filed March 31, 1922. Serial No. 548,431.

*To all whom it may concern:*

Be it known that I, CHARLES F. HICKS, a citizen of the United States, residing at Romeo, in the county of Macomb and State of Michigan, have invented new and useful Improvements in Tire Liners, of which the following is a specification.

This invention relates to vehicle tires, particularly to reliners, and has for its object the provision of a device of this character which will render an ordinary tire casing puncture proof and which will also tend to reduce the danger of blowouts and naturally greatly increase the length of the life of the tire.

An important and more specific object is the provision of a reliner of this character which is shaped for conforming engagement within the tire casing and which is also so constructed as to positively eliminate any possibility of chafing or pinching the inner tube.

Yet another object is the provision of a reliner of this character which is formed of a combination of fabric which constitutes a sheet or envelope within which is disposed a series of spring elements arranged in overlapping relation, the spring element being slidable with respect to one another during the travel of the wheel equipped with the tire so as to insure proper flexibility and not interfere in any way with the easy riding quality of the tire.

An additional object is the provision of a device of this character which will be simple and inexpensive in manufacture and installation, highly efficient in use, durable in service and a general improvement in the art.

With the above and other objects and advantages in view, the invention consists in the details of construction to be hereinafter more fully described and claimed and illustrated in the accompanying drawings in which, Figure 1 is a longitudinal section through a portion of a tire casing having my reliner disposed therein.

Figure 4 is a longitudinal section of a portion of the liner with the various parts thereof opened up and somewhat separated.

Figure 5 is a plan view with parts broken away.

Figure 6 is a detail perspective view of one of the metal plates.

Figure 7 is a detail perspective view of another of the metal plates.

Figure 1:
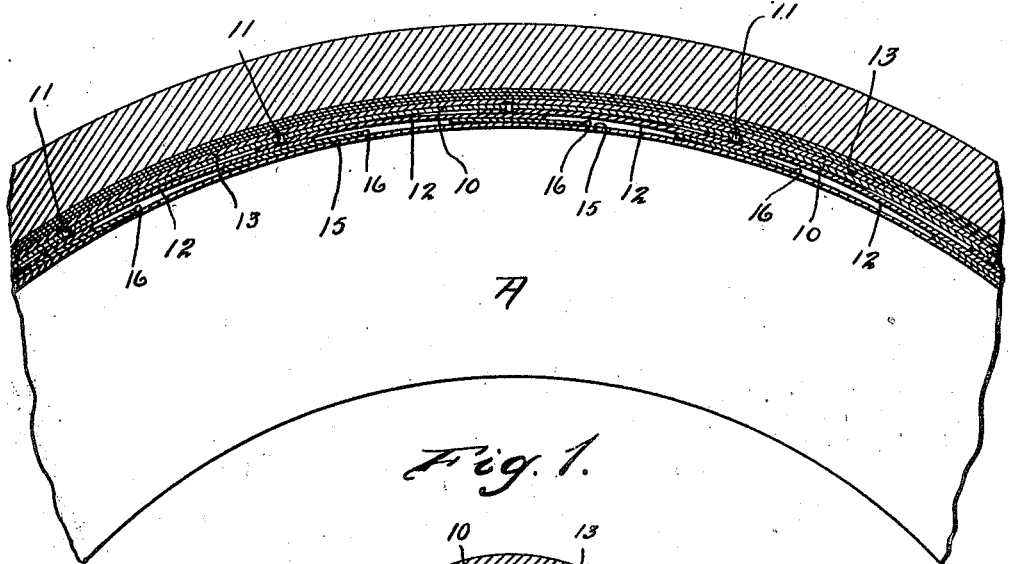
Figure 2:
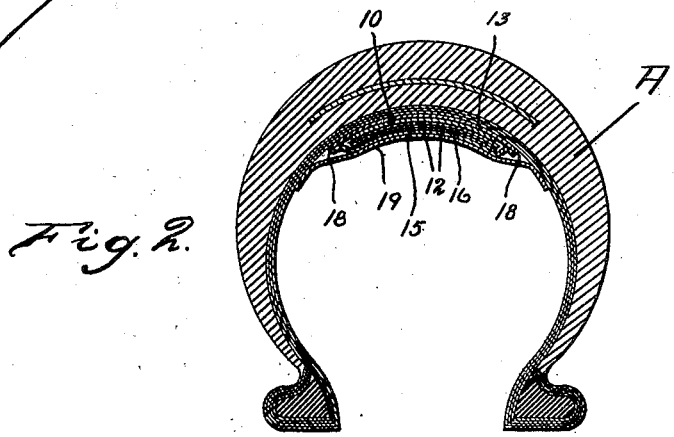
Figure 2 is a cross sectional view through the tire casing and showing the reliner in position.
Figure 3:
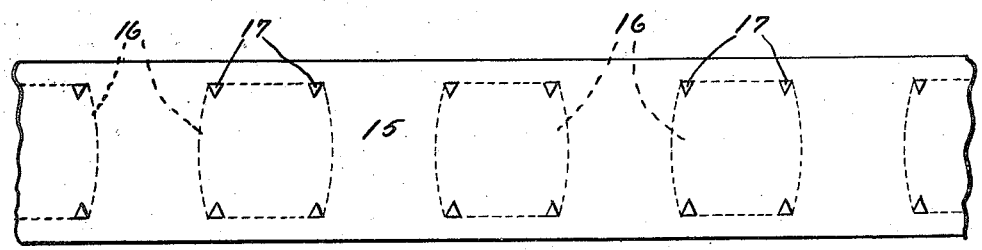
Figure 3 is an inside or bottom plan view of the reliner.

Referring more particularly to the drawings I have shown my reliner structure as comprising a strip 10 of suitable fabric, such as canvas or the like, upon the inner periphery of which is riveted as shown at 11 a plurality of metal plates 12 which are curved longitudinally and also transversely as shown and which have rounded corners. These plates have a longitudinal curvature of greater abruptness than the curvature of the tire casing with which the liner is designed to be used whereby to provide a certain degree of resilience. In actual practice these plates might be constructed of any desired material though it is preferable that they be formed of spring steel whereby to have a great resisting effect and consequently prevent punctures from any sharp objects. These plates 12 are so arranged that their ends are somewhat in over-lapping relation as clearly disclosed. Disposed outwardly of the strip of fabric 10 is a strip 13 of leather or some suitable rubberized fabric which is for the purpose of covering the rivets 11 and which is of considerably greater width than the strip 10 so as to project beyond the edges thereof for a purpose to be described.

The numeral 15 designates a strip of canvas or the like but preferably rubberized cloth of the same width as the strip 14 and upon this strip 15 are secured at intervals smaller metal plates 16 which are likewise curved longitudinally and transversely and which are arranged at such points as to be in engagement with the overlapping ends of the plates 12. The plates 16 might be secured in place by a large variety of ways though in actual practice I prefer to form each plate 16 with tongues or prongs 17 at the corners and these prongs are forced through the strip 15 and subsequently bent over or clinched to hold them against any possible displacement.

As stated above the strips 13 and 15 are of the same width and project beyond the edges of the strip 10, these projecting edges 18 being suitably vulcanized together whereby to provide a strong structure which constitutes a sheath or envelope for the metal plates 12 and 16.

In the use of the device the assembled reliner formed of the parts above described is disposed within the tire casing A and in order to protect the inner tube B from being chafed by the ends of the prongs 17 where they are clinched or bent over, I make use of a strip 19 of fabric such as canvas or the like which is disposed within or inwardly of the inner periphery of the reliner and which covers these prongs and protects the inner tube.

In the use of the device it is inserted within the tire casing, the canvas strip 19 is placed in position and the inner tube is then placed within it in the usual manner. In the operation it is of course apparent that there will be no puncturing owing to the fact that the metal strips will turn aside any sharp element tending to cause the puncture. It is also apparent that the metal plates increase the resilience of the tire and reinforce it so as to reduce the likelihood of blowouts. Owing to the simplicity of the construction and the fewness of the parts it is apparent that there is nothing to get out of order and that the device should consequently have a long life and satisfactorily perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. A reliner of the character described comprising a strip of flexible material, a plurality of plates secured upon said strip and arranged with their ends in overlapping relation, said plates being formed concavo-convex in longitudinal and transverse sections, a second strip of flexible material, a plurality of concavo-convex plates of smaller size than the first named plates secured upon the outer periphery of said second named strip and arranged in engagement with the overlapping ends of the first named plates, and a third strip of flexible material disposed outwardly of said first named strip and secured to said last named strip.

2. A reliner of the character described comprising a strip of flexible material, a plurality of plates secured upon said strip and arranged with their ends in overlapping relation, said plates being formed concavo-convex in longitudinal and transverse sections, a second strip of flexible material, a plurality of concavo-convex plates of smaller size than the first named plates secured upon the outer periphery of said second named strip and arranged in engagement with the overlapping ends of the first named plates, and a third strip of flexible material disposed outwardly of said first named strip and secured to said last named strip, said third and last named strip being of considerably greater width than said first named strip whereby to project beyond the edges thereof, said projected edges being vulcanized together.

3. A reliner of the character described comprising a strip of flexible material, a plurality of longitudinally and transversely curved plates arranged in overlapping relation and riveted onto said strip, a relatively narrow packing strip disposed outwardly of said first named strip and covering the rivets, an outmost strip of rubberized fabric disposed outwardly of said packing strip and of greater width than first named strip whereby to project beyond the edges thereof, a second strip of rubberized fabric disposed inwardly of the metal plates, a plurality of metal plates disposed upon the outer periphery of said last named rubberized strip and formed at their corners with prongs pushed through and bent over with respect to said last named rubberized strip, said last named strip being of the same width as said first named rubberized strip and the projecting edges of both of the rubberized strips being vulcanized together, and a strip of fabric disposed inwardly of the assembled rubberized strips whereby to cover the prongs and prevent chafing of the inner tube.

In testimony whereof I affix my signature.

CHARLES F. HICKS.